(12) United States Patent
Kimura et al.

(10) Patent No.: US 11,860,910 B2
(45) Date of Patent: Jan. 2, 2024

(54) INFORMATION PROVISION SYSTEM, METHOD, AND PROGRAM

(71) Applicant: NEC Corporation, Tokyo (JP)

(72) Inventors: Keigo Kimura, Tokyo (JP); Kunihiro Takeoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 252 days.

(21) Appl. No.: 17/424,389

(22) PCT Filed: Jan. 23, 2019

(86) PCT No.: PCT/JP2019/002052
§ 371 (c)(1),
(2) Date: Jul. 20, 2021

(87) PCT Pub. No.: WO2020/152804
PCT Pub. Date: Jul. 30, 2020

(65) Prior Publication Data
US 2022/0092088 A1   Mar. 24, 2022

(51) Int. Cl.
*G06F 16/28* (2019.01)
*G06F 16/22* (2019.01)

(52) U.S. Cl.
CPC .......... *G06F 16/288* (2019.01); *G06F 16/221* (2019.01)

(58) Field of Classification Search
CPC .............................. G06F 16/288; G06F 16/221
See application file for complete search history.

(56) References Cited

U.S. PATENT DOCUMENTS

| | | | |
|---|---|---|---|
| 2005/0240615 A1* | 10/2005 | Barsness | G06F 16/2456 707/999.102 |
| 2009/0024951 A1* | 1/2009 | Zeringue | G06F 3/0481 707/E17.054 |
| 2015/0032708 A1* | 1/2015 | Hashimoto | G06F 16/221 707/694 |

(Continued)

FOREIGN PATENT DOCUMENTS

| | | |
|---|---|---|
| JP | 2002-288012 A | 10/2002 |
| JP | 2003-271600 A | 9/2003 |

(Continued)

OTHER PUBLICATIONS

Zhang, Ziqi. "Effective and efficient semantic table interpretation using tableminer+." Semantic Web 8.6 (2017): 921-957.*

(Continued)

*Primary Examiner* — Mohsen Almani

(57) ABSTRACT

Provided is an information provision system that can provide workers with useful information for combining tables, so that even workers with little specialized knowledge can smoothly proceed with the task of combining multiple tables. An input unit 81 receives input of multiple tables. An identification unit 82 identifies a pair of columns that are in a combinable relationship, identifies that a pair of tables to which the individual columns forming the pair belong is the pair of tables to be combined, and identifies a combine method of the tables to be combined. An output unit 83 outputs the pair of tables to be combined, the pair of columns in a combinable relationship, and the combine method of the tables to be combined.

5 Claims, 12 Drawing Sheets

(56) References Cited

U.S. PATENT DOCUMENTS

| | | | |
|---|---|---|---|
| 2016/0173122 A1 | 6/2016 | Akitomi et al. | |
| 2018/0157633 A1* | 6/2018 | He | G06F 16/217 |
| 2018/0157706 A1* | 6/2018 | He | G06F 16/2456 |
| 2018/0240019 A1 | 8/2018 | Sato et al. | |
| 2018/0336235 A1* | 11/2018 | Peña Muñoz | G06F 16/219 |
| 2019/0095472 A1* | 3/2019 | Griffith | G06F 16/2456 |

FOREIGN PATENT DOCUMENTS

| | | | |
|---|---|---|---|
| JP | 2015-075970 A | 4/2015 | |
| JP | 2016-081526 A | 5/2016 | |
| WO | 2015/025386 A1 | 3/2017 | |
| WO | 2018/016001 A1 | 1/2018 | |
| WO | 2018/025706 A1 | 8/2018 | |

OTHER PUBLICATIONS

Miller, Renée J., et al. "Making Open Data Transparent: Data Discovery on Open Data." IEEE Data Eng. Bull. 41.2 (2018): 59-70.*

He, Yeye, Kris Ganjam, and Xu Chu. "Sema-join: joining semantically-related tables using big table corpora." Proceedings of the VLDB Endowment 8.12 (2015): 1358-1369.*

Deng, Dong, et al. "The Data Civilizer System." Cidr. 2017.*

Cafarella, Michael J., et al. "Webtables: exploring the power of tables on the web." Proceedings of the VLDB Endowment 1.1 (2008): 538-549.*

Limaye, Girija, Sunita Sarawagi, and Soumen Chakrabarti. "Annotating and searching web tables using entities, types and relationships." Proceedings of the VLDB Endowment 3.1-2 (2010): 1338-1347.*

Hoffart, Johannes, et al. "YAGO2: A spatially and temporally enhanced knowledge base from Wikipedia." Artificial intelligence 194 (2013): 28-61. (Year: 2013).*

Güting, Ralf Hartmut. "An introduction to spatial database systems." the VLDB Journal 3 (1994): 357-399. (Year: 1994).*

Seeger, Jens-Peter Dittrich Bernhard, and David Scot Taylor Peter Widmayer. "Progressive Merge Join: A Generic and Non-Blocking Sort-Based Join Algorithm'." Proceedings 2002 VLDB Conference: 28th International Conference on Very Large Databases (VLDB). Elsevier, 2002. (Year: 2002).*

Gao, Shi. Integration, Provenance, and Temporal Queries for Large-Scale Knowledge Bases. Diss. UCLA, 2016. (Year: 2016).*

Lehmberg, Oliver, et al. "The mannheim search join engine." Journal of Web Semantics 35 (2015): 159-166. (Year: 2015).*

Jiang, Lilong, Michael Mandel, and Arnab Nandi. "Gesturequery: A multitouch database query interface." Proceedings of the VLDB Endowment 6.12 (2013): 1342-1345. (Year: 2013).*

International Search Report for PCT Application No. PCT/JP2019/002052, dated Mar. 5, 2019.

English translation of Written opinion for PCT Application No. PCT/JP2019/002052, dated Mar. 5, 2019.

Petros Venetis et al., "Recovering Semantics of Tables on the Web", [retrieved Jul. 20, 2016], Internet <URL: http://www.vldb.org/pvldb/vol4/p528-venetis.pdf>.

* cited by examiner

| | Entity-ID | Entity-ID | Time | None |
|---|---|---|---|---|
| | STORE NAME | PRODUCT NAME | DATE AND TIME | SALES |
| | TOKYO A STORE | MILK | 11/25 | 100 |
| | KYOTO B STORE | MILK | 11/25 | 120 |
| | OSAKA C STORE | MILK | 11/25 | 110 |
| | TOKYO A STORE | BREAD | 11/25 | 50 |
| | KYOTO B STORE | BREAD | 11/25 | 80 |
| | OSAKA C STORE | BREAD | 11/25 | 90 |
| | TOKYO A STORE | MILK | 11/26 | 100 |
| | KYOTO B STORE | MILK | 11/26 | 120 |
| | OSAKA C STORE | MILK | 11/26 | 110 |

| PRODUCT NAME (Entity-ID) | PRICE (None) |
|---|---|
| MILK | ¥110 |
| BREAD | ¥100 |
| JUICE | ¥150 |

| STORE NAME (Entity-ID) | ADDRESS (Space) | SIZE (None) |
|---|---|---|
| TOKYO A STORE | 1-1 OTA-ku, TOKYO | 120m² |
| KYOTO B STORE | 2-3 UJI-shi, KYOTO | 150m² |
| OSAKA C STORE | 4-5 OSAKA-shi, OSAKA | 100m² |
| OKINAWA D STORE | 6-7 NAHA-shi, OKINAWA | 70m² |

| | Space | Time | None | None | |
|---|---|---|---|---|---|
| | PREFECTURES | DATE AND TIME | WEATHER | TEMPERATURE | |
| | TOKYO | 11/25 | SUNNY | 21°C | |
| | KYOTO | 11/25 | SUNNY | 22°C | ~24 |
| | OSAKA | 11/25 | RAINY | 13°C | |
| | TOKYO | 11/26 | CLOUDY | 16°C | |
| | KYOTO | 11/26 | SUNNY | 21°C | |
| | OSAKA | 11/26 | CLOUDY | 18°C | |

FIG. 11

| STORE NAME | PRODUCT NAME | DATE AND TIME | SALES | SIZE | PREFECTURES | WEATHER | TEMPERATURE | PRICE |
|---|---|---|---|---|---|---|---|---|
| TOKYO A STORE | MILK | 11/25 | 100 | 120m² | TOKYO | SUNNY | 21°C | ¥110 |
| KYOTO B STORE | MILK | 11/25 | 120 | 150m² | KYOTO | SUNNY | 22°C | ¥110 |
| OSAKA C STORE | MILK | 11/25 | 110 | 100m² | OSAKA | RAINY | 13°C | ¥110 |
| TOKYO A STORE | BREAD | 11/25 | 50 | 120m² | TOKYO | SUNNY | 21°C | ¥100 |
| KYOTO B STORE | BREAD | 11/25 | 80 | 150m² | KYOTO | SUNNY | 22°C | ¥100 |
| OSAKA C STORE | BREAD | 11/25 | 90 | 100m² | OSAKA | RAINY | 13°C | ¥100 |
| TOKYO A STORE | MILK | 11/26 | 100 | 120m² | TOKYO | CLOUDY | 16°C | ¥110 |
| KYOTO B STORE | MILK | 11/26 | 120 | 150m² | KYOTO | SUNNY | 21°C | ¥110 |
| OSAKA C STORE | MILK | 11/26 | 110 | 100m² | OSAKA | CLOUDY | 18°C | ¥110 |

INFORMATION PROVISION SYSTEM, METHOD, AND PROGRAM

This application is a National Stage Entry of PCT/JP2019/002052 filed on Jan. 23, 2019, the contents of all of which are incorporated herein by reference, in their entirety.

TECHNICAL FIELD

The present invention relates to an information provision system, an information provision method, and an information provision program that provide workers (users) with information concerning the task of combining tables.

BACKGROUND ART

Non-patent literature 1 describes a technique for estimating the meaning of the columns of a table using ontology.

A technique for estimating the meaning of the columns of a table is also described in patent literature 1.

In addition, patent literature 2 describes a system for processing the combining of data in table format.

CITATION LIST

Patent Literature

Patent literature 1: International Patent Publication No. 2018/025706
Patent literature 2: Re-publication 2015/025386

Non-Patent Literature

Non-Patent literature 1: Petros Venetis, 7 others, "Recovering Semantics of Tables on the Web", [retrieved 20 Jul. 2016], Internet<URL: http://www.vldb.org/pvldb/vol4/p528-venetis.pdf>

SUMMARY OF INVENTION

Technical Problem

In data analysis, a lot of time is spent on data formatting necessary for data analysis. Specifically, a lot of time is spent on a task of combining multiple given tables.

The task of combining multiple given tables requires a lot of expertise, therefore, many experts are required.

Therefore, it is an object of the present invention to provide an information provision system, an information provision method, and an information provision program that can provide workers with useful information for the task of combining tables so that even workers (users) with little specialized knowledge can smoothly proceed with the task of combining multiple tables.

Solution to Problem

An information provision system according to the present invention includes an input unit to which multiple tables are input, an identification unit which identifies a pair of columns that are in a combinable relationship, identifies that a pair of tables to which the individual columns forming the pair belong is the pair of tables to be combined, and identifies a combine method of the tables to be combined, and an output unit which outputs the pair of tables to be combined, the pair of columns in a combinable relationship, and the combine method of the tables to be combined.

An information provision method according to the present invention, implemented by a computer, includes receiving input of multiple tables, identifying a pair of columns that are in a combinable relationship, identifying that a pair of tables to which the individual columns forming the pair belong is the pair of tables to be combined, and identifying a combine method of the tables to be combined, and outputting the pair of tables to be combined, the pair of columns in a combinable relationship, and the combine method of the tables to be combined.

An information provision program according to the present invention, implemented in a computer including an input unit to which multiple tables are input, causes the computer to execute an identifying process of identifying a pair of columns that are in a combinable relationship, identifying that a pair of tables to which the individual columns forming the pair belong is the pair of tables to be combined, and identifying a combine method of the tables to be combined, and an outputting process of outputting the pair of tables to be combined, the pair of columns in a combinable relationship, and the combine method of the tables to be combined.

Advantageous Effects of Invention

According to the present invention, it is possible to provide workers with useful information for combining tables, so that even workers with little specialized knowledge can smoothly proceed with the task of combining multiple tables.

BRIEF DESCRIPTION OF DRAWINGS

FIG. 7 It depicts a schematic diagram showing an example of an input table.

FIG. 8 It depicts a schematic diagram showing an example of an input table.

FIG. 9 It depicts a schematic diagram showing an example of an input table.

FIG. 11 It depicts a schematic diagram showing a result of combining the tables shown in FIG. 6 through FIG. 9 according to the information shown in FIG. 10.

DESCRIPTION OF EMBODIMENTS

Hereinafter, an example embodiment of the present invention will be described with reference to the drawings.

Example Embodiment 1

Figure 1:
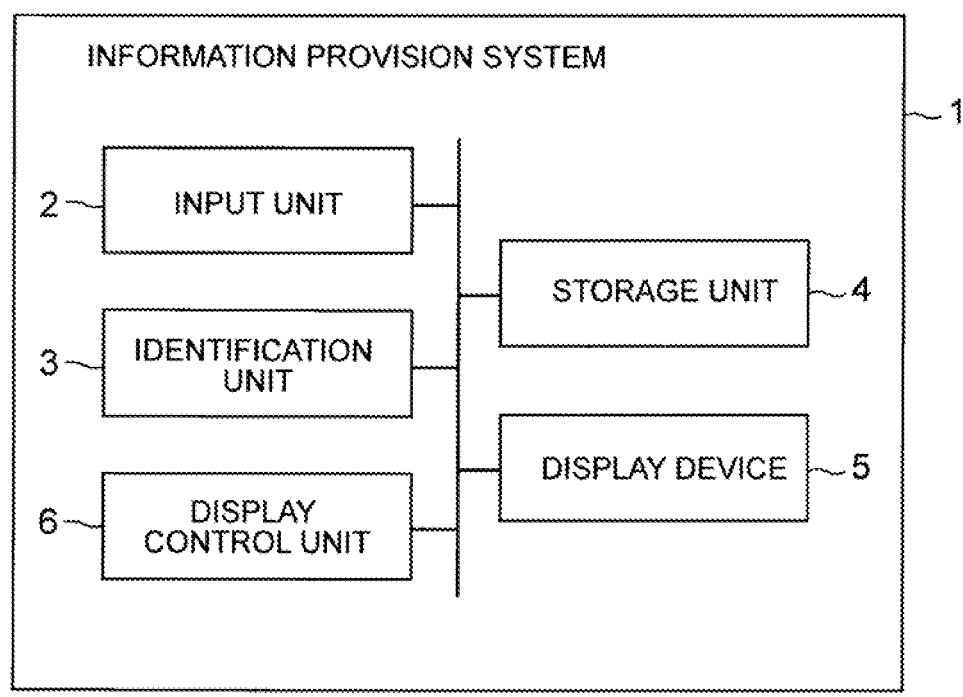
FIG. 1 It depicts a block diagram of an example of an information provision system of the first example embodiment of the present invention.
Figure 2:
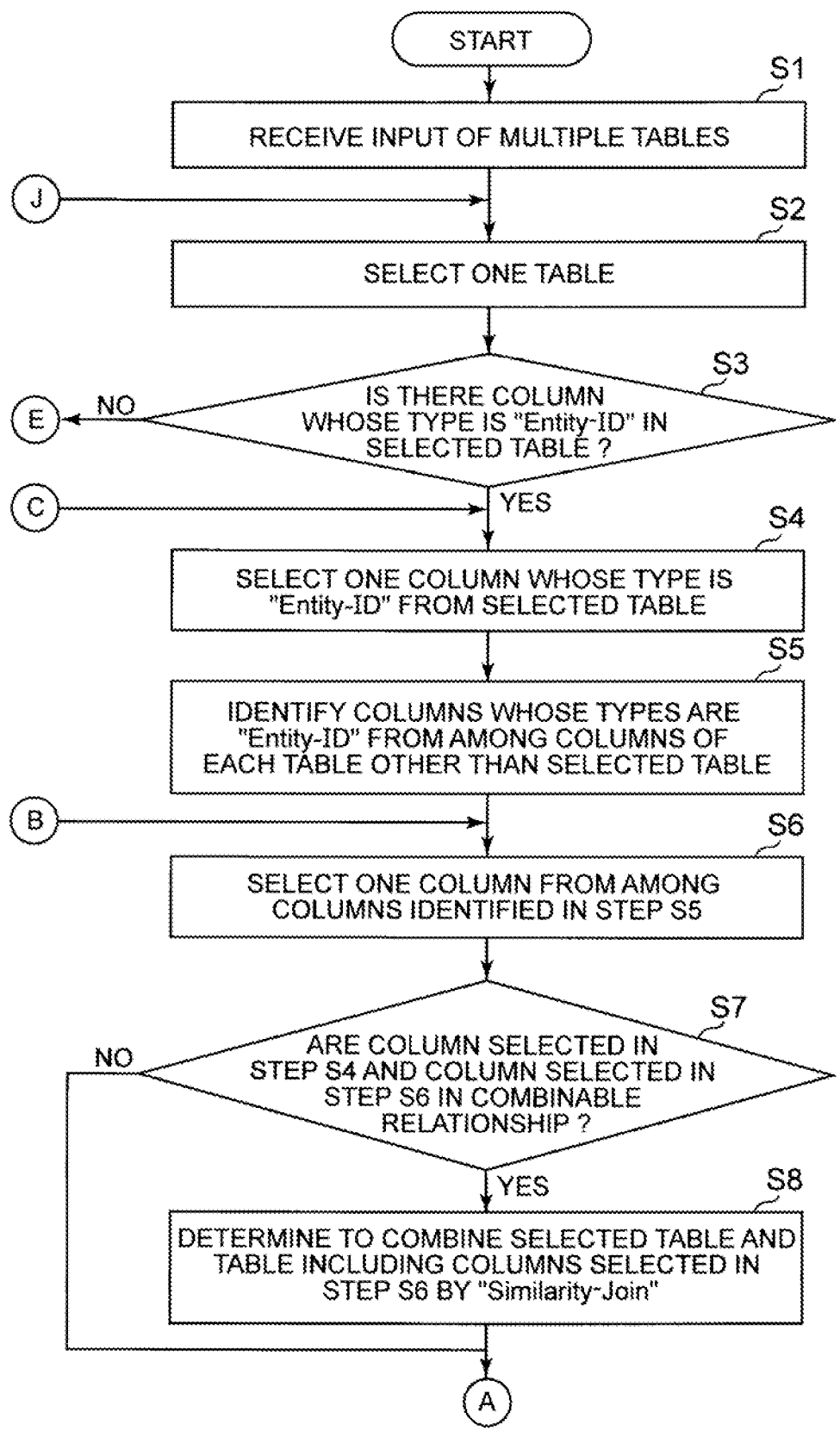
FIG. 2 It depicts a flowchart showing an example of processing of an information provision system of the first example embodiment.

FIG. 1 is a block diagram of an example of an information provision system of the first example embodiment of the present invention. The information provision system 1 of the present invention comprises an input unit 2, an identification unit 3, a storage unit 4, a display device 5, and a display control unit 6.

The input unit 2 is an input device to which multiple tables are input. For example, the input unit 2 may be a data reading device that reads multiple tables from a data recording medium, such as a magneto-optical disk, which records the multiple tables recorded.

In present example embodiment, it is assumed that the individual column of each table input into the input unit 2 is assigned a column type (meaning of the column) in advance. The column type is defined separately from a column name. The table may not include a column name. The column type can be determined before each table is input into the information provision system 1 by a worker (user) or an external information processing device, for example.

It is assumed that there are at least three types of column types of "Entity-Identifier", "Time", and "Location". In present example embodiment, the four types of column types are "Entity-Identifier", "Time", "Location", and "None". Each column in each table has one of the following types of "Entity-Identifier", "Time", "Location", and "None". However, there may be other types than the above four types.

The type "Entity-Identifier" represents a column consisting of attribute values that indicate that it corresponds to a row in an arbitrary table and has the property of being a primary key. The type "Entity-Identifier" is hereinafter referred to as "Entity-ID".

The type "Time" represents a column whose individual attribute value is a date, time, or date and time.

The type "Location" represents a column whose individual attribute value is location or position. Hereinafter, the type "Location" is referred to as "Space".

The type "None" represents a column that does not correspond to either "Entity-ID", "Time", or "Space".

The identification unit 3 refers to the input multiple tables, identifies pairs of columns that are in a combinable relationship, identifies a pair of tables to which the individual columns that make up the pair belong as a pair of tables to be combined, and further identifies a combine method of the tables to be combined.

The combination of the pair of tables to be combined, the pair of columns in a combinable relationship, and the combine method of the tables identified by the identification unit 3 may not be one, but multiple combinations may be identified by the identification unit 3.

"Similarity-Join", "Temporal-Join", "Spatial-Join", etc. are some of the combine methods that combine paired tables based on the pairs of columns that are in a combinable relationship. Examples of these combine methods are described below.

The storage unit 4 is a storage device that stores the combination of the pair of tables to be combined, the pair of columns in a combinable relationship, and the combine method of the tables identified by the identification unit 3.

The display control unit 6 displays on the display device 5 the pair of tables to be combined, the pair of columns in a combinable relationship, and the combine method of the tables identified by the identification unit 3.

The identification unit 3 and the display control unit 6 are realized, for example, by a CPU (Central Processing Unit) of a computer that operates according to an information providing program. For example, the CPU may read the information provision program from a program storage medium such as a program storage device of the computer, and operate as the identification unit 3 and the display control unit 6 according to the information provision program.

Next, the processing of present example embodiment will be explained. FIG. 2, FIG. 3, FIG. 4 and FIG. 5 are flowcharts showing an example of the processing of the information provision system 1 of the present example embodiment. In the following, for ease of explanation, the case where there is at most one column with the type "Time" in one table, and similarly, at most one column with the type "Space" in one table is supposed as an example. The number of columns with the type "Entity-ID" in a table is not limited.

First, the input unit 2 receives input of multiple tables (step S1). Each column of the individual tables to be input is assigned a column type in advance. In this example, the case where each of the tables shown in FIG. 6, FIG. 7, FIG. 8, and FIG. 9 is input in Step S1 is supposed as an example.

Figures 5, 6:
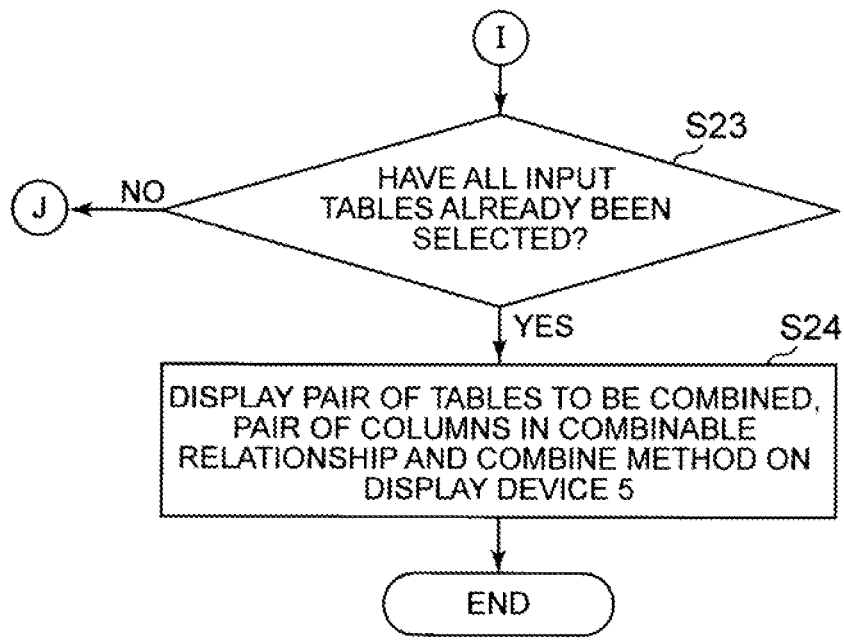
FIG. 5 It depicts a flowchart showing an example of processing of an information provision system of the first example embodiment.
FIG. 6 It depicts a schematic diagram showing an example of an input table.

Table 21 shown in FIG. 6 includes two columns with the type "Entity-ID", one column with the type "Time", and one column with the type "None".

Table 22 shown in FIG. 7 includes one column with the type "Entity-ID" and one column with the type "None".

Table 23 shown in FIG. 8 includes one column with the type "Entity-ID", one column with the type "Space", and one column with the type "None".

Table 24 shown in FIG. 9 includes one column with the type "Space", one column with the type "Time", and two columns with the type "None".

Next to step S1, the identification unit 3 selects one unselected table out of the multiple tables input in step S1 (step S2). The table that has been selected is hereinafter referred to as the selected table. Here, the case where the identification unit 3 selects the table 21 (refer to FIG. 6) in step S2 is supposed as an example. In other words, the case where the selected table is the table 21 is supposed as an example.

Next to Step S2, the identification unit 3 determines whether or not there is a column whose type is "Entity-ID" in the selected table (step S3). When there is no column in the selected table whose type is "Entity-ID" (No in step S3), the process proceeds to step S11 (refer to FIG. 3) described below. When there is a column in the selected table whose type is "Entity-ID," the process proceeds to step S4. In this example, the selected table (Table 21 shown in FIG. 6) includes a column whose type is "Entity-ID". Therefore, the process proceeds to step S4.

In step S4, the identification unit 3 selects one column whose type is "Entity-ID" from the selected table. At this time, the identification unit 3 excludes columns that have already been selected in step S4 from the selection target. Here, it is assumed that the identification unit 3 selects the column whose column name is "Store name" from Table 21 shown in FIG. 6.

Next, the identification unit 3 identifies columns whose types are "Entity-ID" from among the columns of each table other than the selected table (step S5). When there are multiple columns whose type is "Entity-ID" among the columns of each table other than the selected table, the identification unit 3 identifies all of the multiple columns. In this example, the identification unit 3 identifies, in step S5, the column whose column name in Table 22 (refer to FIG. 7) is "Product Name" and the column whose column name in Table 23 (refer to FIG. 8) is "Store Name".

Next, the identification unit 3 selects one unselected column from among the columns identified in step S5 (step S6). Here, the case of selecting the column whose column name in Table 23 is "Store Name" is supposed as an example.

Next, the identification unit 3 determines whether the column selected in step S4 and the column selected in step S6 are in a combinable relationship (step S7).

In step S7, the identification unit 3 calculates, for example, an edit distance between attribute values for each combination of the individual attribute values included in the column selected in step S4 and the individual attribute values included in the column selected in step S6. Then, if the number of combinations of attribute values for which the edit distance is less than or equal to a threshold value is greater than or equal to a predetermined number, the identification unit 3 can determine that the two columns are in a combinable relationship. If the number of combinations of attribute values for which the edit distance is less than or equal to the threshold value is less than the predetermined number, the identification unit 3 can determine that the two columns are not in a combinable relationship. The above threshold and predetermined number of values can be set in advance.

The method of determining whether or not two columns whose types are "Entity-ID" are in a combinable relationship in step S7 (in other words, a condition for determining that two columns whose types are "Entity-ID" are in a combinable relationship) is not limited to the above example. In step S7, the identification unit 3 may use other methods to determine whether or not two columns are in a combinable relationship.

When it is determined that the two columns are in a combinable relationship (Yes in step S7), the process proceeds to step S8. When it is determined that the two columns are not in a combinable relationship (No in step S7), the process proceeds to step S9 (refer to FIG. 3).

In this example, the column selected in step S4 (the column whose column name in Table 21 (refer to FIG. 6) is "Store Name") and the column selected in step S6 (the column whose column name in Table 23 (refer to FIG. 8) is "Store Name") both have the store name as an attribute value. Therefore, the case where the number of combinations of attribute values for which the edit distance is less than or equal to a threshold value is greater than a predetermined number, and the identification unit 3 determines that the two columns are in a combinable relationship is supposed as an example (Yes in step S7).

In this case, the process proceeds to step S8, and the identification unit 3 determines to combine the selected table (in this example, Table 21 shown in FIG. 6) and the table including the columns selected in step S6 (in this example, Table 23 shown in FIG. 8) by "Similarity-Join" (step S8).

The pair of tables identified in the process of steps S7 and S8 is a pair of tables to be combined. In step S8, the identification unit 3 stores in the storage unit 4 a combination of the pair of tables to be combined (in this example, the pair of Tables 21 and 23), the pair of columns in a combinable relationship (in this example, the pair of columns whose column name is "Store Name" in Table 21 and whose column name is "Store Name" in Table 23), and the combine method (in this example, "Similarity-Join").

Figure 3:
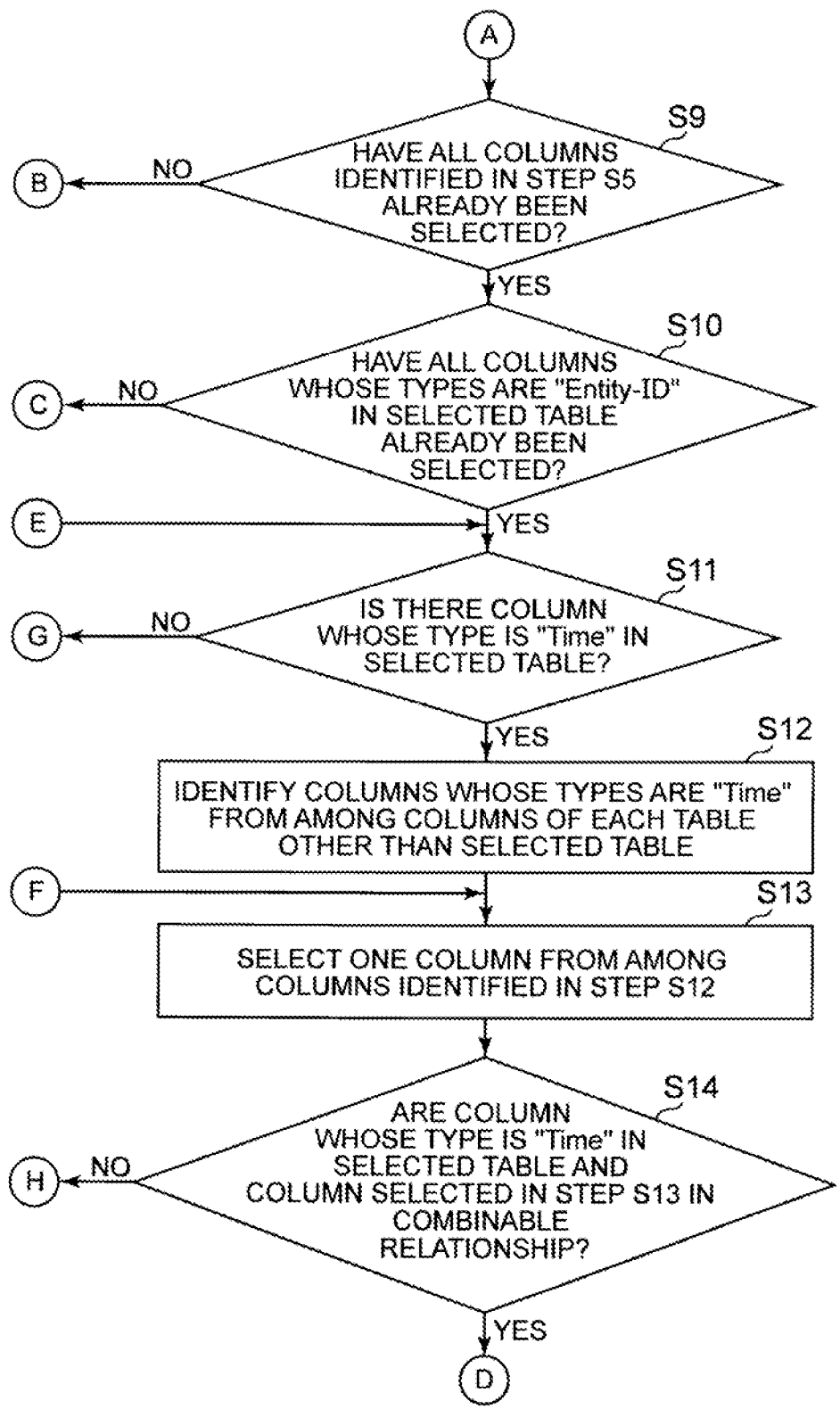
FIG. 3 It depicts a flowchart showing an example of processing of an information provision system of the first example embodiment.
Figure 4:
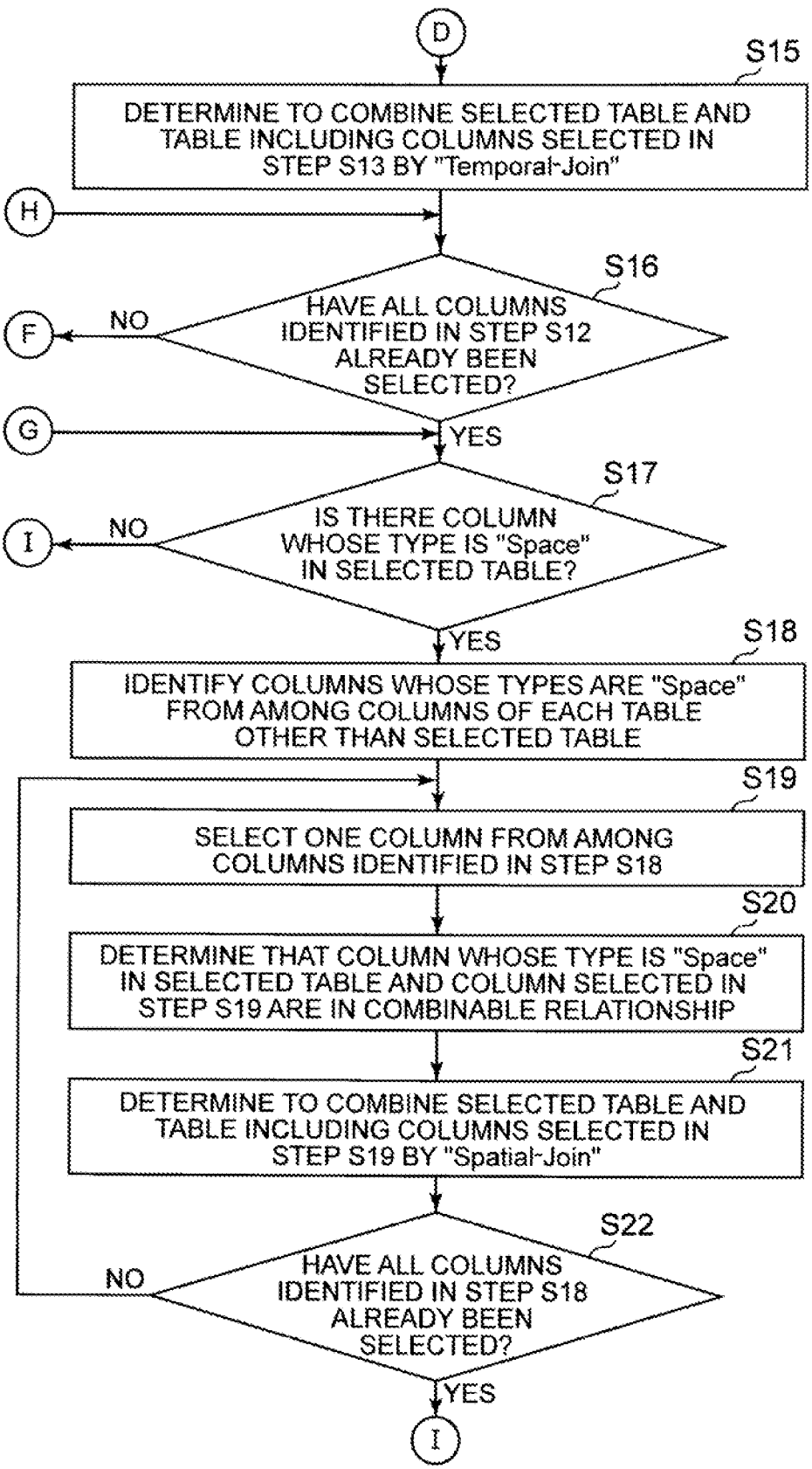
FIG. 4 It depicts a flowchart showing an example of processing of an information provision system of the first example embodiment.

After step S8, the process proceeds to step S9 (refer to FIG. 3). In step S9, the identification unit 3 determines whether or not all the columns identified in step S5 have already been selected. When all the columns identified in step S5 have been selected in step S6 (Yes in step S9), then the process proceeds to step S10. When there are columns identified in step S5 that have not yet been selected in step S6 (No in step S9), then the identification unit 3 repeats the process of step S6 and the subsequent processes.

In this example, the column whose column name is "Product Name" in Table 22 (refer to FIG. 7) has not yet been selected in step S6. Therefore, the process proceeds to step S6, the identification unit 3 selects the column whose column name in Table 22 is "Product Name" in step S6.

Then, the identification unit 3 determines whether the column selected in step S4 and the column selected in step S6 are in a combinable relationship (step S7). The column selected in step S4 (the column whose name in Table 21 (refer to FIG. 6) is "Store Name") is a column whose attribute value is the store name. On the other hand, the column selected in step S6 (the column whose name in Table 22 is "Product Name") is a column whose attribute value is the product name. Therefore, the case where the number of combinations of attribute values for which the edit distance is less than or equal to a threshold is less than a predetermined number, and the identification unit 3 determines that the two columns are not in a combinable relationship is supposed as an example (No in step S7).

In this case, the step S8 is not executed and the process proceeds to step S9. Here, both of the two columns identified in step S5 have already been selected in step S6. Therefore, the identification unit 3 determines that all the columns identified in step S5 have already been selected (Yes in step S9), and the process proceeds to step S10.

In step S10, the identification unit 3 determines whether or not all the columns whose types are "Entity-ID" in the selected table have already been selected. When all the columns whose types are "Entity-ID" in the selected table have already been selected in step S4 (Yes in step S10), then the process proceeds to step S11. When there are any columns whose types are "Entity-ID" in the selected table that have not yet been selected in step S4 (No in step S10), the identification unit 3 repeats the process of step S4 and the subsequent processes.

In this example, the column whose column name is "Product Name" in Table 21 corresponding to the selected table has not yet been selected in step S4. Therefore, the process proceeds to step S4, and the identification unit 3 selects the column whose column name is "Product Name" in Table 21 in step S4. Since the process of steps S4 to S10 has already been described, a detailed explanation is omitted here. Here, if the column whose column name in Table 22 (refer to FIG. 7) is "Product Name" is selected in step S6, the identification unit 3 executes steps S7 and S8 sequentially. Then, in step S8, the identification unit 3 stores in the storage unit 4 a combination of the pair of tables to be combined (in this example, the pair of Tables 21 and 22), the pair of columns in a combinable relationship (in this example, the pair of columns whose column name is "Product Name" in Table 21 and whose column name is "Product Name" in Table 22), and the combine method (in this example, "Similarity-Join").

At the time of proceeding to step S10 again, all the columns in Table 21 whose types are "Entity-ID" have already been selected (Yes in step S10). Therefore, the process proceeds to step S11.

In step S11, the identification unit 3 determines whether or not there is a column whose type is "Time" in the selected table. When the column whose type is the type "Time" does not exist in the selected table (No in step S11), the process proceeds to step S17 (refer to FIG. 4) described below. When there is a column whose type is "Time" (Yes in step S11) in the selected table, the process proceeds to step S12. In this example, the selected table (Table 21 shown in FIG. 6) includes a column whose type is "Time". Therefore, the process proceeds to step S12.

In step S12, the identification unit 3 identifies the columns whose types are "Time" from among the columns of each table other than the selected table. When there are the multiple columns whose types are "Time" among the columns of each table other than the selected table, the identification unit 3 identifies all of multiple columns. In this example, the identification unit 3 identifies, in step S12, the column whose column name is "Date and Time" in Table 24 (refer to FIG. 9). Therefore, in this example, one column is identified in step S12.

Next, the identification unit 3 selects one unselected column from among the columns identified in step S12 (step S13). In this example, the identification unit 3 selects the column whose column name in Table 24 is "Date and Time".

Next, the identification unit 3 determines whether the column whose type is "Time" in the selected table and the column selected in step S13 are in a combinable relationship (step S14).

In step S14, the identification unit 3 determines whether or not the two columns whose types are "Time" are in a combinable relationship. An example of this determination is shown below. For example, when the two columns whose types are "Time" both have an attribute value of "Time" (not including date), or when the two columns whose types are "Time" both have an attribute value of "Date" (which may include time as well) as the attribute value, the identification unit 3 may determine that the two columns are in a combinable relationship (Yes in step S14). In other cases, the identification unit 3 may determine that the two columns are not in a combinable relationship (No in step S14). For example, when one of the two columns whose type is "Time" has only the time (not including date) as its attribute value, and the other has only the date as its attribute value, the identification unit 3 determines that the two columns are not in a combinable relationship.

In this example, the column whose type is "Time" in the selected table (the column whose name in Table 21 is "Date and Time") and the column selected in step S13 (the column whose name in Table 24 is "Date and Time") both have date as their attribute value (refer to FIG. 6 and FIG. 9). Therefore, in this example, in step S14, the identification unit 3 determines that the two columns whose types are "Time" are in a combinable relationship (Yes in step S14).

The method of determining whether or not the two columns whose types are "Time" are in a combinable relationship in step S14 (in other words, a condition for determining that the two columns whose types are "Time" are in a combinable relationship) is not limited to the above example. In step S14, the identification unit 3 may use other methods to determine whether or not the two columns are in a combinable relationship.

When it is determined in step S14 that the two columns are not in a combinable relationship (No in step S14), the process proceeds to step S16 (refer to FIG. 4) described below. When it is determined in step S14 that the two columns are in a combinable relationship (Yes in step S14), the process proceeds to step S15 (refer to FIG. 4). In this example, the process proceeds to step S15.

In step S15, the identification unit 3 determines to combine the selected table (in this example, Table 21) and the table including the columns selected in step S13 (in this example, Table 24 shown in FIG. 9) by "Temporal-Join".

The pair of tables identified in the process of steps S14 and S15 is a pair of tables to be combined. In step S15, the identification unit 3 stores in the storage unit 4 a combination of the pair of tables to be combined (in this example, the pair of Tables 21 and 24), the pair of columns in a combinable relationship (in this example, the pair of columns whose column name is "Date and Time" in Table 21 and whose column name is "Date and Time" in Table 24), and the combine method (in this example, "Temporal-Join").

After step S15, the process proceeds to step S16. In step S16, the identification unit 3 determines whether or not all the columns identified in step S12 have already been selected. When all the columns identified in step S12 have already been selected in step S13 (Yes in step S16), then process proceeds to step S17. When there are columns identified in step S12 that have not yet been selected in step S13 (No in step S16), then the identification unit 3 repeats the process of step S13 and the subsequent processes.

In this example, only one column (the column whose name in Table 24 is "Date and Time") is identified in step S12, and that column is selected in step S13 (Yes in step S16). Therefore, the process proceeds to step S17.

Here, for ease of explanation, the case where there is at most one column with the type "Time" in one table is supposed as an example. If there are two or more columns with "Time" as the type in the selected table, the identification unit 3 may execute the process of steps S12 to S16 for each of the columns.

In step S17, the identification unit 3 determines whether or not there is a column whose type is "Space" in the selected table. When the column whose type is "Space" does not exist in the selected table (No in step S17), the process proceeds to step S23 (refer to FIG. 5). When there is a column whose type is "Space" in the selected table (Yes in step S17), the process proceeds to step S18 (refer to FIG. 4).

In this example, since there is no column whose type is "Space" in Table 21 corresponding to the selected table (No in step S17), the process proceeds to step S23. The process for proceeding to step S18 will be described below.

In step S23, the identification unit 3 determines whether or not all the tables input in step S1 have already been selected. When all the input tables have been selected in step S2 (Yes in step S23), then the process proceeds to step S24. When any of the input tables have not yet been selected in step S2 (No in step S23), then the identification unit 3 repeats the process of step S2 and the subsequent processes.

In this example, the identification unit 3 has not yet selected Tables 22, 23, 24. Accordingly, the identification unit 3 repeats the process of step S2 and the subsequent processes. The following is an example of a case where the process proceeds from step S23 to step S2 and the identification unit 3 selects Table 23 (refer to FIG. 8) in step S2. In this step S2 and thereafter, Table 23 corresponds to the selected table.

After step S2, in step S3, the identification unit 3 determines that there is a column whose type is "Entity-ID" in the selected table (Table 23) (Yes in Step S3). Therefore, the identification unit 3 executes the process of step S4 and the subsequent processes. Since the loop processing of steps S4 to S10 has already been explained, the explanation is omitted here.

In step S10 (refer to FIG. 3), when it is determined that all the columns whose types are "Entity-ID" in the selected table have been selected (Yes in step S10), the process proceeds to step S11. In step S11, the identification unit 3 determines whether or not there is a column whose type is "Time" in the selected table. In this example, since there is no column whose type is "Time" in the selected table (Table 23) (No in step S11), the process proceeds to step S17 (refer to FIG. 4).

In step S17, the identification unit 3 determines whether or not there is a column whose type is "Space" in the selected table (Table 23). In this example, there is a column whose type is "Space" in the Table 23 (Yes in step S17). Therefore, the process proceeds to step S18.

In step S18, the identification unit 3 identifies the columns whose types are "Space" from among the columns of each table other than the selected table. When there are multiple columns whose types are "space" among the columns of each table other than the selected table, the identification unit 3 identifies all of the multiple columns. In this example, the identification unit 3 identifies the column whose column name is "Prefectures" in Table 24 (refer to FIG. 9) in step S18. Therefore, in this example, one column is identified in step S18.

Next, the identification unit 3 selects one unselected column from among the columns identified in step S18 (step S19). In this example, the identification unit 3 selects the column whose column name in Table 24 is "Prefectures".

Next, the identification unit 3 determines that the column whose type is "Space" in the selected table (in this example, the column whose name is "Address" in Table 23) and the column selected in step S19 (in this example, the column whose name is "Prefectures" in Table 24) are in a combinable relationship (step S20).

Next, the identification unit 3 determines to combine the selected table (in this example, Table 23) and the table including the columns selected in step S19 (in this example, Table 24) by "Spatial-Join" (step S21).

The pair of tables identified in the process of steps S20 and S21 is a pair of tables to be combined. In step S21, the identification unit 3 stores in the storage unit 4 a combination of the pair of tables to be combined (in this example, the pair of Tables 23 and 24), the pair of columns in a combinable relationship (in this example, the pair of columns whose column name is "Address" in Table 23 and whose column name is "Prefectures" in Table 24), and the combine method (in this example, "Spatial-Join").

After step S21, the process proceeds to step S22. In step S22, the identification unit 3 determines whether or not all the columns identified in step S18 have already been selected. When all the columns identified in step S18 have already been selected in step S19 (Yes in step S22), then the process proceeds to step S23 (refer to FIG. 5). When there are columns identified in step S18 that have not been selected in step S19 (No in step S22), then the identification unit 3 repeats the process of step S19 and the subsequent processes.

In this example, only one column (the column whose name in Table 24 is "Prefectures") is identified in step S18, and that column is selected in step S19 (Yes in step S22). Therefore, the process proceeds to step S23.

Here, for ease of explanation, this example assumes that there is at most one column with the type "Space" in one table. When there are two or more columns whose types are "Space" in the selected table, the identification unit 3 may execute the processing of steps S18 to S22 for each column.

As already explained, in step S23, the identification unit 3 determines whether or not all the tables input in step S1 have already been selected. When there are any tables among the input tables that have not yet been selected in step S2 (No in step S23), then the identification unit 3 repeats the process of step S2 and the subsequent processes. In this example, Tables 22 and 24 have not yet been selected. Therefore, the identification unit 3 selects Table 22 in step S2 and repeats the process of step S3 and the subsequent processes. When the process proceeding to step S2 again, the identification unit 3 selects Table 24 and repeats the process of step S3 and the subsequent processes.

In step S23, when the identification unit 3 determines that all the tables input in step S1 have already been selected (Yes in step S23), the process proceeds to step S24.

In step S24, the display control unit 6 reads the combination of the pair of tables to be combined, the pair of columns in a combinable relationship, and the combine method from the storage unit 4. Then, the display control unit 6 displays on the display device 5 the combination of the pair of tables to be combined, the pair of columns in a combinable relationship, and the combine method, respectively, based on each combination read from the storage unit 4.

Figure 10:
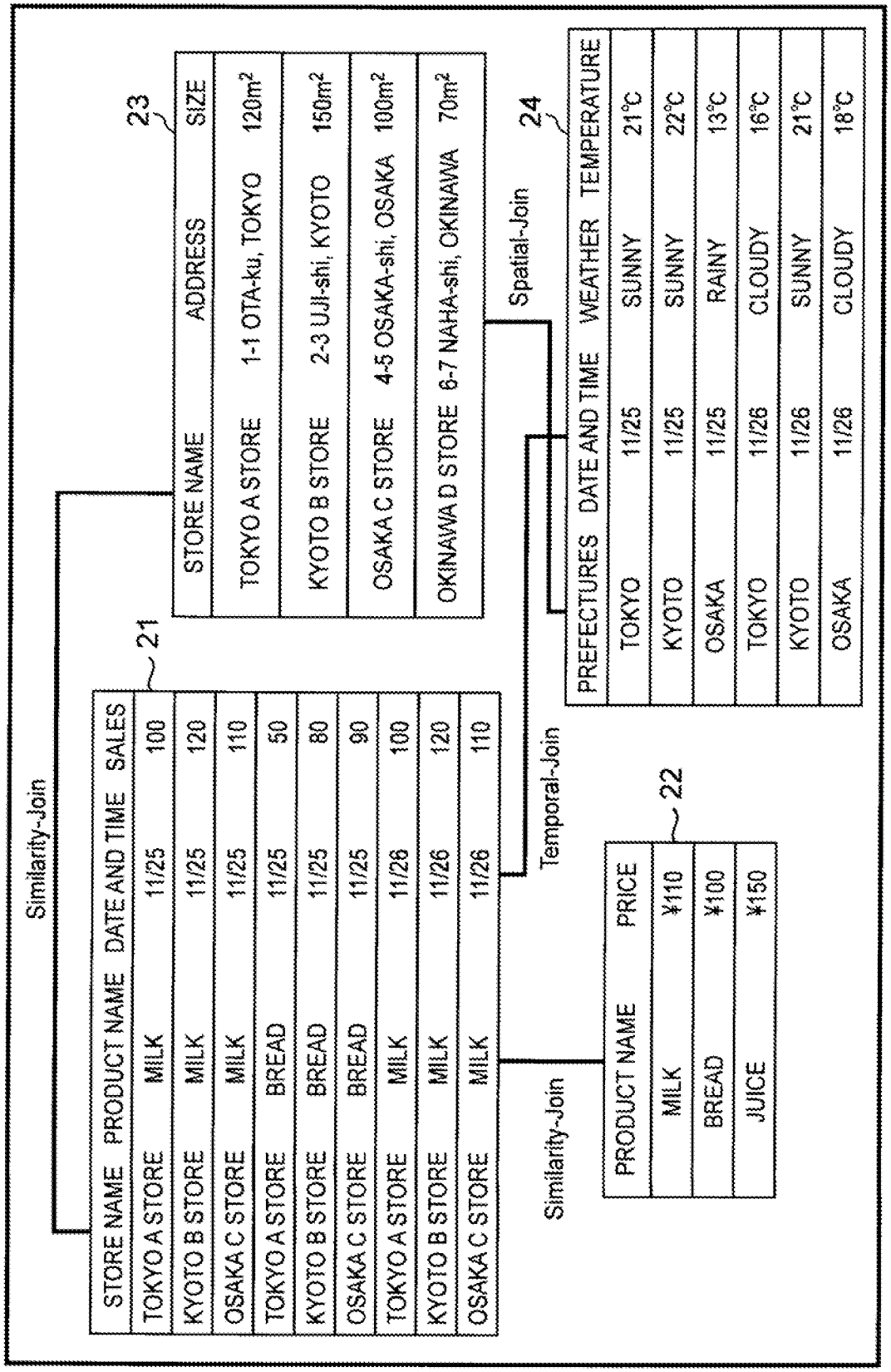
FIG. 10 It depicts a schematic diagram showing an example of an information displayed by a display control unit 6 on the display device 5 in step S24.

FIG. 10 is a schematic diagram showing an example of the information that the display control unit 6 displays on the display device 5 in step S24. The display control unit 6, for example, displays each input table on the display device 5. Furthermore, for each combination of the pair of tables to be combined, the pair of columns in a combinable relationship, and the combine method, the display control unit 6 displays a line connecting the columns in a combinable relationship on the display device 5, and displays the combine method included in the combination near the line (refer to FIG. 10). When the columns in a combinable relationship are connected by a line, the tables to which the columns belong are also connected by the line. Therefore, in the example shown in FIG. 10, that the display control unit 6 displays on the display device 5 the lines connecting the columns in a combinable relationship would display a pair of columns in a combinable relationship and also display a pair of tables to be combined based on the pair of columns. In the example shown in FIG. 10, the combine method is displayed near the line.

Accordingly, in the display form illustrated in FIG. 10, the display control unit 6 can display the pair of tables to be combined, the pair of columns in a combinable relationship, and the combine method of the tables, as identified by the identification unit 3. In the example shown in FIG. 10, for example, Tables 21 and 22 are a pair of tables to be combined, and the combine method is "Similarity-Join" when combining Tables 21 and 22 based on the column of "Product Name" in Table 21 and the column of "Product Name" in Table 22. However, the display form of information by the display control unit 6 is not limited to the example shown in FIG. 10.

As a result of the process illustrated in the flowchart, it may be determined that one column is in a combinable relationship with multiple columns. In this case, lines extending from the one column to multiple columns will be displayed.

According to the present example embodiment, the display control unit 6 displays on the display device 5 a pair of tables to be combined, a pair of columns in a combinable relationship, and a combine method of the tables. Therefore, the information provision system 1 of the present example embodiment can provide to a worker (a user of the information provision system 1) which method should be used to combine the tables based on which column of which table and which column of which table. Accordingly, even a worker with little specialized knowledge can smoothly proceed with a task of combining multiple tables. In other words, according to the present example embodiment, useful information can be provided to the worker for the task of combining tables for data analysis.

The following are examples of table combine process using "Similarity-Join", "Temporal-Join", and "Spatial-Join". However, the combine processes shown below are examples, and each combine process is not limited to the examples shown below. The information provision system 1 may or may not comprise a combine unit (not shown) that executes the combine process of tables according to the contents presented to the worker by the display control unit 6. When the information provision system 1 comprises such a combine unit, the combine unit is realized, for example, by a CPU of a computer operating according to an information provision program. In this case, the CPU can read an information provision program from a program recording medium such as a program storage device in the computer, and operate as the identification unit 3, the display control unit 6, and the combine unit according to the information provision program.

If the information provision system 1 does not comprise such a combine unit, for example, an external system other than the information provision system 1 may combine the tables according to the instructions of the worker. In this case, the worker may give instructions to the external system regarding table combines based on the information (information shown in FIG. 10, which is displayed on the display device 5 by the display control unit 6) provided by the information provision system 1 of the present invention.

The case where the combine method "Similarity-Join" is defined along with two columns that are in a combinable relationship will be explained. It is assumed that a pair of an arbitrary attribute value (referred to as attribute value a) in one column (referred to as column A) and an arbitrary attribute value (referred to as attribute value b) in the other column (referred to as column B), satisfying the condition that the edit distance between the attribute values is equal to or less than a threshold value, is specified. In this case, the record including the attribute value b in the table including column B may be added to the record including the attribute value a in the table including column A. Here, the case where the edit distance of attribute values is used as an example, but word embeddings may also be used to identify a pair of attribute values. For example, suppose that a distance between the vectors obtained by word2vec from attribute values a and b respectively is calculated, and a pair having a distance which is less than the threshold are identified. In this case, as described above, the record including the attribute value b in the table including column B may be added to the record including the attribute value a in the table including column A.

The case where the combine method "Temporal-Join" is defined along with two columns that are in a combinable relationship will be explained. It is assumed that a pair of an arbitrary attribute value (referred to as attribute value a) in one column (referred to as column A) and an arbitrary attribute value (referred to as attribute value b) in the other column (referred to as column B), under the condition that a time period within a predetermined range centered on the attribute value a overlaps a time period within a predetermined range centered on the attribute value b, is specified. In this case, the record including the attribute value b in the table including column B may be added to the record including the attribute value a in the table including column A.

The case where the combine method "Spatial-Join" is defined along with two columns that are in a combinable relationship will be explained. It is assumed that a pair of an arbitrary attribute value (referred to as attribute value a) in one column (referred to as column A) and an arbitrary attribute value (referred to as attribute value b) in the other column (referred to as column B), under the condition that a distance between the coordinates obtained from attribute value a (for example, latitude and longitude) and the coordinates obtained from attribute value b is equal to or less than a threshold value, is specified. In this case, the record including the attribute value b in the table including column B may be added to the record including the attribute value a in the table including column A. As the distance between the two coordinates, for example, Euclidean distance or Manhattan distance can be used.

These combine processes are examples, and the combine processes of tables by "Similarity-Join", "Temporal-Join", and "Spatial-Join" are not limited to the above examples.

FIG. 11 shows the result of combining each of the aforementioned Tables 21-24 according to the information shown in FIG. 10.

Next, modifications of the present example embodiment will be explained. The various modifications shown below can also be applied to following second example embodiment.

In step S6 (refer to FIG. 2), step S13 (refer to FIG. 3), and step S19 (refer to FIG. 4) of the flowchart illustrated in the first example embodiment, the identification unit 3 may exclude from the selection target a column that has already been determined to be in a combinable relationship with another column. In this case, the identification unit 3 treats the column excluded from the selection target in step S6 due to the fact that it is already defined as being in a combinable relationship with other columns as the column already selected in step S6, in step S9 (refer to FIG. 3). Similarly, the identification unit 3 treats the column excluded from the selection target in step S13 as the column already selected in step S13, in step S16 (refer to FIG. 4). Similarly, the identification unit 3 treats the column excluded from the selection target in step S19 as the column already selected in step S19, in step S22 (refer to FIG. 4). In this way, the processing time can be shortened by excluding from the selection target the columns that have already been determined to be in a combinable relationship with other columns in steps S6, S13, and S19.

In step S2 (refer to FIG. 2) of the flowchart illustrated in the first example embodiment, the identification unit 3 may exclude from the selection target a table that is already defined to be combined with another table. In this case, the identification unit 3 treats the table excluded from selection in step S2 due to the fact that it is already defined to be combined with other tables as a table that has already been selected in step S2, in step S23 (refer to FIG. 5). In this way, the processing time can be shortened by excluding tables that have already defined to be combined with other tables from the selection target in Step S2.

In the multiple tables to be input, there may be a pair of columns, belonging to different tables respectively, that are predetermined to be in a combinable relationship, and the combine method for the different tables may be predetermined. In other words, in the multiple tables to be input, there may be a combination of a pair of tables to be combined, a pair of columns that are in a combinable relationship, and a combine method that has already been defined. The worker may not be able to determine all the combinations of the pairs of tables to be combined, the pairs of columns in a combinable relationship, and the combine methods, but may be able to determine some of the combinations based on knowledge which the worker has. In such a case, the worker can input the multiple tables into the input unit 2 along with information indicating the combinations that the worker has been able to determine. In this case, as explained in the previous modification, in step S6 (refer to FIG. 2), step S13 (refer to FIG. 3), and step S19 (refer to FIG. 4), the identification unit 3 may exclude from the selection target the column that has already been determined to be in a combinable relationship with other columns. Then, in step S9 (refer to FIG. 3), the identification unit 3 may treat the column excluded from the selection target in step S6 as the column already selected in step S6. Similarly, the identification unit 3 can treat the column excluded from the selection target in step S13 as the column already selected in step S13, in step S16 (refer to FIG. 4). Similarly, the identification unit 3 can treat the column excluded from the selection target in step S19 as the column already selected in step S19, in step S22 (refer to FIG. 4).

Figure 12:
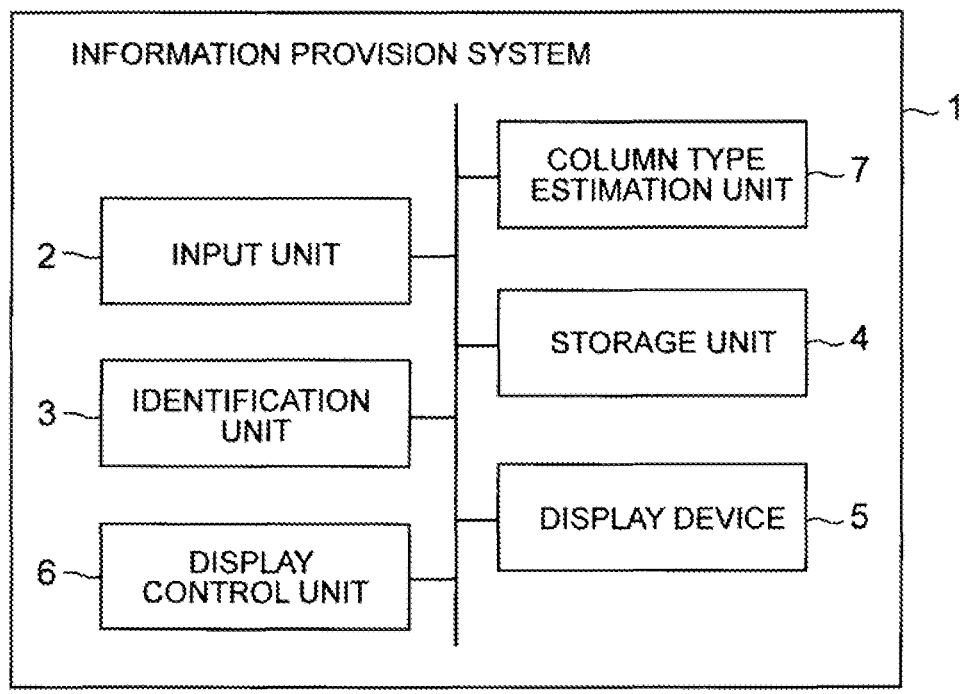
FIG. 12 It depicts a block diagram showing one of modifications of the first example embodiment.

FIG. 12 shows another modification of the first example embodiment. Elements similar to those shown in FIG. 1 are marked with the same signs as in FIG. 1, and the explanation is omitted.

In the modification shown in FIG. 12, the information provision system 1 has a column type estimation unit 7 in addition to each of the elements shown in FIG. 1. In the first example embodiment described above, a case in which a column type (column meaning) is assigned in advance to individual columns of individual tables input to the input unit 2 is supposed as an example. In this modification, the column types need not be assigned to the individual columns of the individual tables that are input to the input unit 2.

For each individual column of the individual tables input to the input unit 2, the column type estimation unit 7 estimates the type of the column based on the attribute values included in the column, and adds (assigns) the estimated type to the column. In this modification, when multiple tables are input to the input unit 2 in step S1 (refer to FIG. 2), for example, before the execution of the first step S2, the column type estimation unit 7 may estimate the column type for each individual column of the individual tables input to the input unit 2, based on the attribute values included in the column, and add the estimated type to the column. Then, the identification unit 3 may execute the process of step S2 and the subsequent processes, by referring to the column type added to each individual column of each table by the column type estimation unit 7.

The method by which the column type estimation unit 7 estimates the type of an individual column based on the attribute values included in the column can be a known method. For example, the column type estimation unit 7 may estimate a type of an individual column by the method of estimating the meaning of a column described in the non-patent literature 1 or the method of estimating the meaning of a column described in the patent literature 1. At this time, it is assumed that there are at least "Entity-ID", "Time", and "Space" as column types. If the column type estimator 7 obtains a type other than these three types as an estimation result, the column type estimator 7 may replace the type with "None".

The column type estimation unit 7 is realized, for example, by a CPU of a computer that operates according to the information provision program. In this case, the CPU can read the information provision program from a program storage medium such as a program storage device in the computer, and operate as the column type estimation unit 7, the identification unit 3, and the display control unit 6 according to the information provision program.

Example Embodiment 2

As one of the modifications of the first example embodiment, it is explained that there may be a combination of a pair of tables to be combined, a pair of columns that are in a combinable relationship, and a combine method that has already been defined, in the multiple tables to be input.

The information provision system of the second example embodiment presents combinations of pairs of tables to be combined, pairs of columns in a combinable relationship, and combine methods to a worker, and adds such combinations in response to an operation of the worker.

Figure 13:
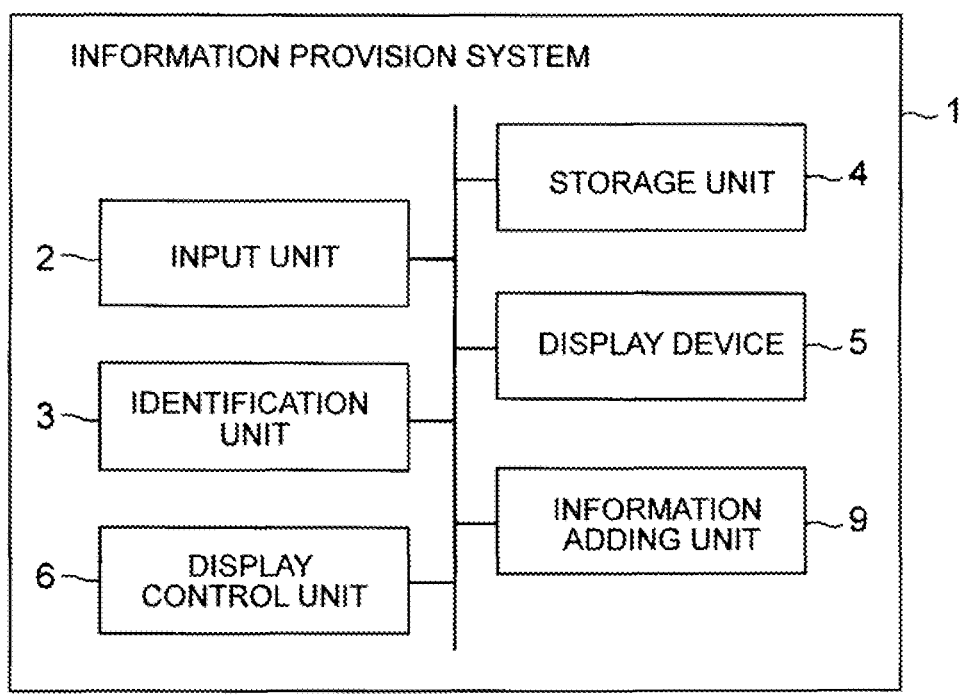
FIG. 13 It depicts a block diagram of an example of an information provision system of the second example embodiment of the present invention.

FIG. 13 is a block diagram of an example of an information provision system of the second example embodiment. Elements similar to those shown in FIG. 1 are marked with the same sign as in FIG. 1 and the explanation is omitted. The information provision system 1 of the second example embodiment includes an information adding unit 9 in addition to each of the elements shown in FIG. 1.

The operations from step S1 (refer to FIG. 2) to step S24 (refer to FIG. 5) described in the first example embodiment are the same in the second example embodiment.

However, in present example embodiment, the display control unit 6 displays, in step S24, a GUI (Graphical User Interface) for a worker to add combinations of pairs of tables to be combined, pairs of columns in a combinable relationship, and combine methods, together with the individual combinations (combinations of pairs of tables to be combined, pairs of columns in a combinable relationship, and combine methods) identified by the identification unit 3.

The information adding unit 9 receives a combination of a pair of tables to be combined, a pair of columns in a combinable relationship, and a combine method according to the operation to the GUI by the worker, and stores the combination in the storage unit 4.

When the information adding unit 9 stores a new combination in the storage unit 4, the display control unit 6 reads the combination as well, and additionally displays on the display device 5 the pair of tables to be combined, the pair of columns in a combinable relationship, and the combine method included in the combination.

Figure 14:
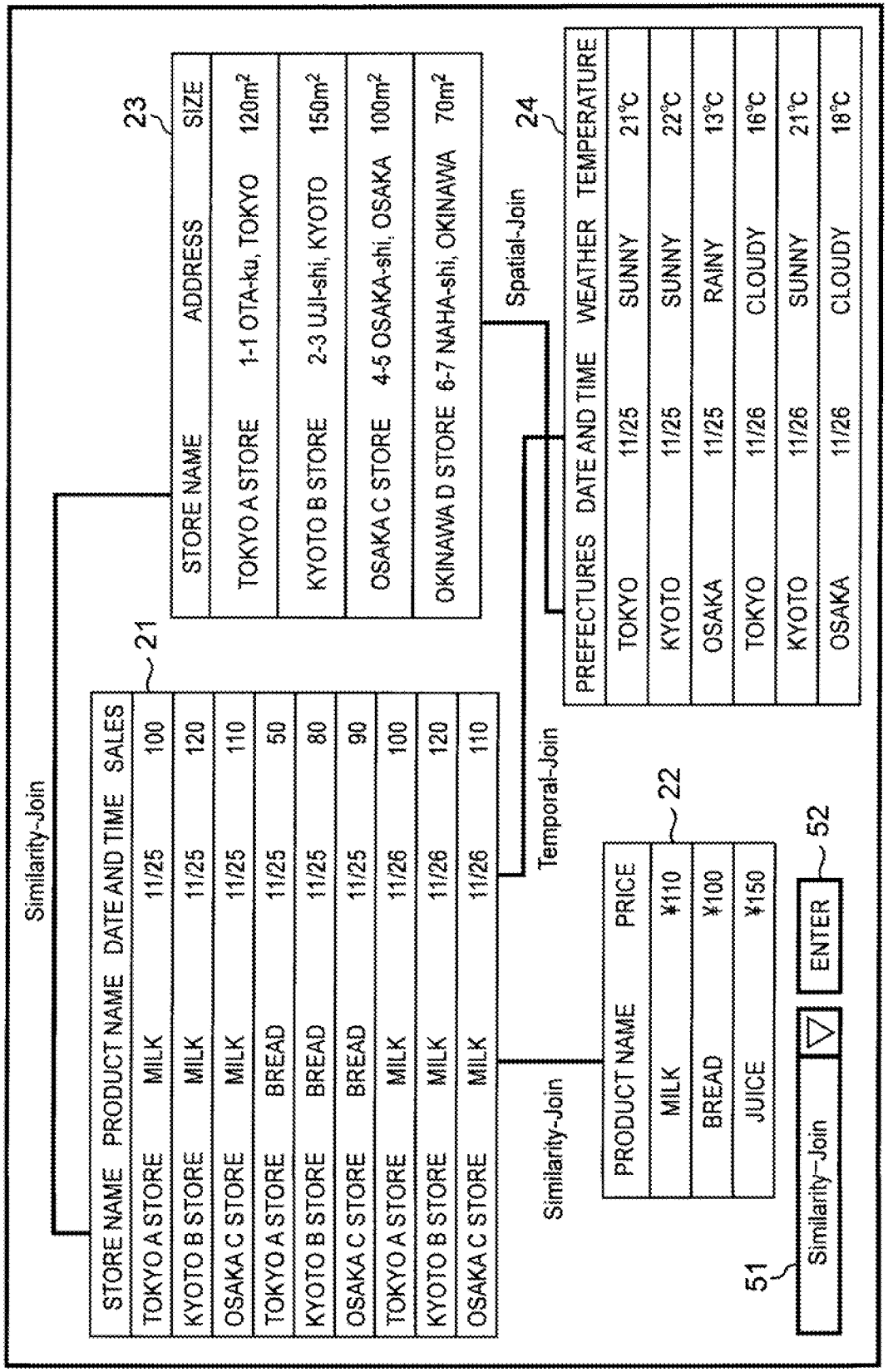
FIG. 14 It depicts a schematic diagram showing an example of a screen including a GUI displayed in step S24 in the second example embodiment.

FIG. 14 is a schematic diagram of an example of a screen including a GUI displayed in step S24. In the second example embodiment, the display control unit 6 displays a screen illustrated in FIG. 14 on the display device 5 in step S24. The screen shown in FIG. 14 includes a pull-down menu 51 and an enter button 52. The display contents other than the pull-down menu 51 and the enter button 52 are the same as the display contents illustrated in FIG. 10. However, each column of each table shown in FIG. 14 can be specified by mouse clicking or other operations. The pull-down menu 51 is used by the worker to specify the combine method of tables, such as "Similarity-Join", "Temporal-Join", and "Spatial-Join".

An example of the operation in which the information adding unit 9 receives additional information from a worker is explained with reference to FIG. 14. Two columns (a pair of columns) belonging to different tables are specified by the worker using mouse clicks or other operations. In addition, the combine method between the table to which one of the two columns belongs and the table to which the other of the two columns belongs is specified by the pull-down menu 51. Then, the decision button 52 is clicked by the worker. Then, the information adding unit 9 regards the table to which one of the two specified columns belongs and the table to which the other of the two columns belongs as a pair of tables to be combined.

Furthermore, the information adding unit 9 defines the two specified columns as a pair of columns in a combinable relationship. Then, the information adding unit 9 adds a combination of the pair of tables to be combined, the pair of columns in a combinable relationship, and the combine method specified by the pull-down menu 51 to the storage unit 4.

As already explained, when the information adding unit 9 stores a new combination in the storage unit 4, the display control unit 6 reads that combination as well, and additionally displays on the display device 5 the pair of tables to be combined, the pair of columns in a combinable relationship, and the combine method included in the combination.

The information adding unit 9 is realized, for example, by a CPU of a computer that operates according to an information provision program. In this case, the CPU can read the information provision program from a program recording medium such as a program storage device in the computer, and operate as the identification unit 3, display control unit 6, and information adding unit 9 according to the information provision program.

According to the second example embodiment, the same effect as the first example embodiment can be obtained. Furthermore, the second example embodiment allows a worker to have the information provision system 1 add a combination of a pair of tables to be combined, a pair of columns in a combinable relationship, and a combine method, at own decision of the worker.

As mentioned above, various modifications of the first example embodiment can also be applied to the second example embodiment.

Figure 15:
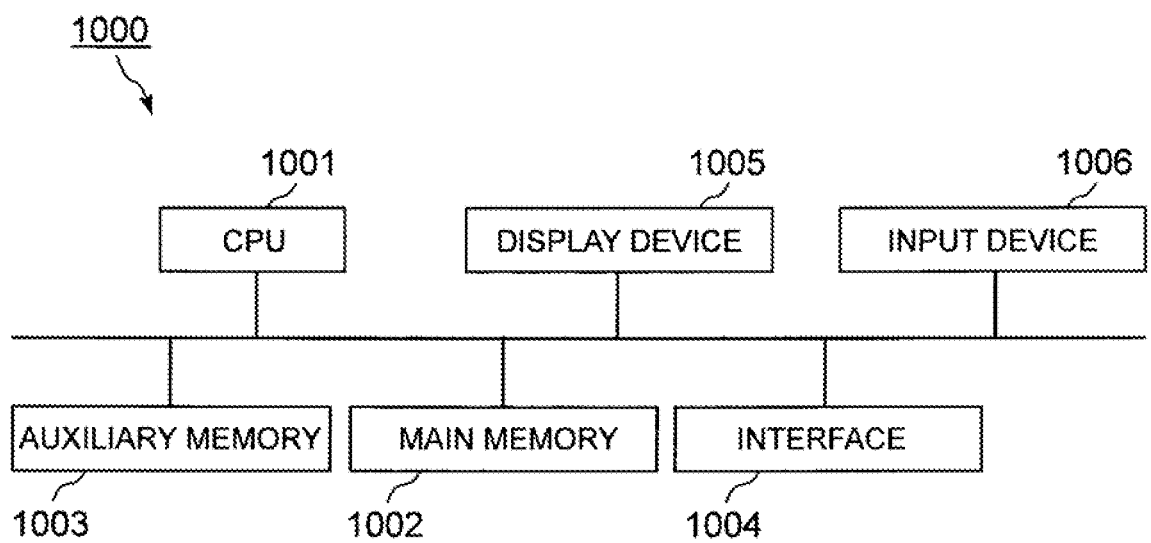
FIG. 15 It depicts a schematic block diagram of a configuration example of a computer for an information provision system of each example embodiment of the present invention.

FIG. 15 shows a schematic block diagram of a computer for the information provision system 1 of each example embodiment of the present invention. The computer 1000 has a CPU 1001, a main memory 1002, an auxiliary memory 1003, an interface 1004, a display device 1005, and an input device 1006.

The information provision system 1 of each example embodiment of the present invention and modifications thereof is realized by a computer 1000. The operation of the information provision system 1 is stored in the auxiliary storage device 1003 in the form of an information provision program. The CPU 1001 reads the information provision program from the auxiliary storage 1003, deploys the information provision program in the main memory 1002, and executes the operation described in each of the above example embodiments and various modifications according to the information provision program.

The auxiliary memory 1003 is an example of a non-transitory tangible medium. Other examples of non-transitory tangible media are a magnetic disk, an optical magnetic disk, a CD-ROM (Compact Disk Read Only Memory), a DVD-ROM (Digital Versatile Disk Read Only Memory), a semiconductor memory, and the like, which are connected through the interface 1004. When the program is delivered to the computer 1000 through a communication line, the computer 1000 that receives the delivery may develop the program into the main memory 1002 and operate according to the program.

The program may also be a program for realizing part of the aforementioned processing. Further, the program may be a difference program that realizes the aforementioned processing in combination with other programs already stored in the auxiliary memory 1003.

Some or all of the components may be realized by general-purpose or dedicated circuitry, processors, or a combination of these. They may be configured by a single chip or by multiple chips connected through a bus. Some or all of the components may be realized by a combination of the above-mentioned circuits, etc. and a program.

When some or all of each component is realized by multiple information processing devices, circuits, etc., the multiple information processing devices, circuits, etc. may be centrally located or distributed. For example, the information processing devices, circuits, etc. may be implemented as a client-and-server system, cloud computing system, etc., each of which is connected through a communication network.

Figure 16:
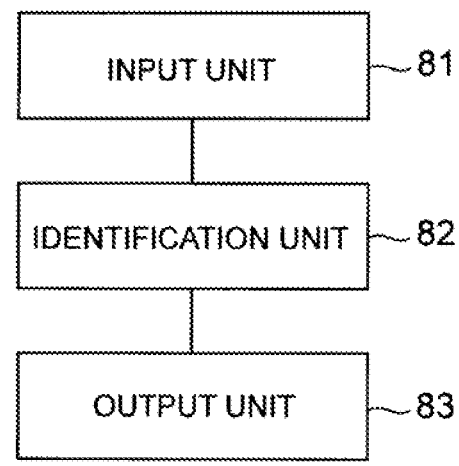
FIG. 16 It depicts a block diagram showing an example of a summarized information provision system of the present invention.

Next, a summary of the present invention will be described. FIG. 16 is a block diagram showing an example of a summarized information provision system of the present invention. The information provision system of the present invention comprises an input unit 81, an identification unit 82, and an output unit 83.

The input unit 81 (for example, input unit 2 in the example embodiment) receives input of multiple tables.

The identification unit 82 (for example, identification unit 3 in the example embodiment) identifies a pair of columns that are in a combinable relationship, identifies that a pair of tables to which the individual columns forming the pair belong is the pair of tables to be combined, and identifies a combine method of the tables to be combined.

The output unit 83 (for example, display control unit 6 in the example embodiment) outputs the pair of tables to be combined, the pair of columns in a combinable relationship, and the combine method of the tables to be combined.

Such a configuration can provide a workers with useful information for combining tables, so that even workers with little specialized knowledge can smoothly proceed with the task of combining multiple tables.

It may also be configured that the identification unit 82 identifies the pair of columns in a combinable relationship based on types of individual columns in the individual tables, identifies that the pair of tables to which the individual columns forming the pair belong is the pair of tables to be combined, and identifies the combine method of the tables to be combined.

It may also be configured that the identification unit 82 when the pair of columns belonging to different tables and having predetermined types, which means that the columns comprise attribute values that indicate that they correspond to a row of an arbitrary table and that have the property of being a primary key, satisfies a first condition, identifies the pair of columns as the pair of columns in a combinable relationship, identifies that the pair of tables to which the individual columns forming the pair belong is the pair of tables to be combined, and identifies the combine method of the tables to be combined as Similarity-Join, when the pair of columns belonging to different tables and having types "Time" satisfies a second condition, identifies the pair of columns as the pair of columns in a combinable relationship, identifies that the pair of tables to which the individual columns forming the pair belong is the pair of tables to be combined, and identifies the combine method of the tables to be combined as Temporal-Join, and identifies the pair of columns belonging to different tables and having types "Location" as the pair of columns in a combinable relationship, identifies that the pair of tables to which the individual columns forming the pair belong is the pair of tables to be combined, and identifies the combine method of the tables to be combined as Spatial-Join.

The multiple tables with column types assigned to individual columns in advance may be input to the input unit 81.

It may also be configured with a column type estimation unit (for example, column type estimation unit 7) that estimates a column type for each individual column of each table input to the input unit 81.

In the multiple tables to be input, there may exist he pair of columns belonging to different tables that are predetermined to be in a combinable relationship, and the combine method of the different tables is predetermined.

It may also be configured with an information adding unit (for example, information adding unit 9) which adds a pair of tables to be combined, a pair of columns in a combinable relationship, and a combine method of the tables to be combined in response to user operation after the pair of tables to be combined, the pair of columns in a combinable relationship, and the combine method of the tables to be combined have been output.

While the present invention has been described with reference to the example embodiments, the present invention is not limited to the aforementioned example embodiments. Various changes understandable to those skilled in the art within the scope of the present invention can be made to the structures and details of the present invention.

INDUSTRIAL APPLICABILITY

This invention is suitably applied to an information provision system that provides workers with information about the task of combining tables.

REFERENCE SIGNS LIST

1 Information provision system
2 Input unit
3 Identification unit
4 Storage unit
5 Display device
6 Display control unit
7 Column type estimation unit
9 Information adding unit

What is claimed is:

1. An information provision system comprising:
a processor; and
a memory storing instructions executable by the processor to:
display a plurality of tables within a graphical user interface (GUI);
display a GUI element by which a table join method is selected as a Similarity-Join method, a Temporal-Join method, or a Spatial-Join method;
receive user selection of a first column of a first table and a second column of a second table displayed within the GUI;
receive user selection of the Similarity-Join method, via the GUI element displayed within the GUI, as the table join method to join the first and second tables;
in response to determining that the first and second columns have a predetermined type and satisfy a first condition, identify that the first and second columns are in a combinable relationship, and combine the first and second tables using the Similarity-Join method that has been selected, wherein the predetermined type is such that the first and second columns comprise attribute values indicating that the first and second columns correspond to a row of an arbitrary table and indicating that the first and second columns have a property of being a primary key, and wherein the first condition is that a number of combinations of the attribute values for which an edit distance is less than or equal to a threshold value is greater than or equal to a predetermined number;
receive user selection of a third column of a third table and a fourth column of a fourth table displayed within the GUI;
receive user selection of the Temporal-Join method, via the GUI element displayed within the GUI, as the table join method to join the third table and fourth tables;
in response to determining that the third and fourth columns have a "Time" type and satisfy a second condition, identify that the third and fourth columns are in the combinable relationship, and combine the third and fourth tables using the Temporal-Join method that has been selected;
receive user selection of a fifth column of a fifth table and a sixth column of a sixth table displayed within the GUI;
receive user selection of the Spatial-Join method, via the GUI element displayed within the GUI, as the table join method to join the fifth and sixth tables;
in response to determining that the fifth and sixth columns have a "Location" type, identify that the fifth and sixth columns are in the combinable relationship, and combine the fifth and sixth tables using the Spatial-Join method that has been selected; and
output a combination table including the first and second tables as have been combined, the third and fourth tables as have been combined, and the fifth and sixth tables as have been combined.

2. The information provision system according to claim 1, wherein the instructions are executable by the processor to further:
receive as input the plurality of tables, each table having a plurality of columns that are each individually assigned to a column type.

3. The information provision system according to claim 1, wherein the instructions are executable by the processor to further:
receive as input the plurality of tables, each table having a plurality of columns; and
estimate a column type of each column of each table.

4. An information provision method comprising:
displaying, by a processor, a plurality of tables within a graphical user interface (GUI);
displaying, by the processor, a GUI element by which a table join method is selected as a Similarity-Join method, a Temporal-Join method, or a Spatial-Join method;
receiving, by the processor, user selection of a first column of a first table and a second column of a second table displayed within the GUI;

receiving, by the processor, user selection of the Similarity-Join method, via the GUI element displayed within the GUI, as the table join method to join the first and second tables;

in response to determining that the first and second columns have a predetermined type and satisfy a first condition, identifying, by the processor, that the first and second columns are in a combinable relationship, and combine the first and second tables using the Similarity-Join method that has been selected, wherein the predetermined type is such that the first and second columns comprise attribute values indicating that the first and second columns correspond to a row of an arbitrary table and indicating that the first and second columns have a property of being a primary key, and wherein the first condition is that a number of combinations of the attribute values for which an edit distance is less than or equal to a threshold value is greater than or equal to a predetermined number;

receiving, by the processor, user selection of a third column of a third table and a fourth column of a fourth table displayed within the GUI;

receiving, by the processor, user selection of the Temporal-Join method, via the GUI element displayed within the GUI, as the table join method to join the third table and fourth tables;

in response to determining that the third and fourth columns have a "Time" type and satisfy a second condition, identifying, by the processor, that the third and fourth columns are in the combinable relationship, and combine the third and fourth tables using the Temporal-Join method that has been selected;

receiving, by the processor, user selection of a fifth column of a fifth table and a sixth column of a sixth table displayed within the GUI;

receiving, by the processor, user selection of the Spatial-Join method, via the GUI element displayed within the GUI, as the table join method to join the fifth and sixth tables;

in response to determining that the fifth and sixth columns have a "Location" type, identifying, by the processor, that the fifth and sixth columns are in the combinable relationship, and combining, by the processor, the fifth and sixth tables using the Spatial-Join method that has been selected; and outputting, by the processor, a combination table including the first and second tables as have been combined, the third and fourth tables as have been combined, and the fifth and sixth tables as have been combined.

5. A non-transitory computer-readable recording medium storing an information provision program executable by a processor to perform processing comprising:

displaying a plurality of tables within a graphical user interface (GUI);

displaying a GUI element by which a table join method is selected as a Similarity-Join method, a Temporal-Join method, or a Spatial-Join method;

receiving user selection of a first column of a first table and a second column of a second table displayed within the GUI;

receiving user selection of the Similarity-Join method, via the GUI element displayed within the GUI, as the table join method to join the first and second tables;

in response to determining that the first and second columns have a predetermined type and satisfy a first condition, identifying that the first and second columns are in a combinable relationship, and combine the first and second tables using the Similarity-Join method that has been selected, wherein the predetermined type is such that the first and second columns comprise attribute values indicating that the first and second columns correspond to a row of an arbitrary table and indicating that the first and second columns have a property of being a primary key, and wherein the first condition is that a number of combinations of the attribute values for which an edit distance is less than or equal to a threshold value is greater than or equal to a predetermined number;

receiving user selection of a third column of a third table and a fourth column of a fourth table displayed within the GUI;

receiving user selection of the Temporal-Join method, via the GUI element displayed within the GUI, as the table join method to join the third table and fourth tables;

in response to determining that the third and fourth columns have a "Time" type and satisfy a second condition, identifying that the third and fourth columns are in the combinable relationship, and combine the third and fourth tables using the Temporal-Join method that has been selected;

receiving user selection of a fifth column of a fifth table and a sixth column of a sixth table displayed within the GUI;

receiving user selection of the Spatial-Join method, via the GUI element displayed within the GUI, as the table join method to join the fifth and sixth tables;

in response to determining that the fifth and sixth columns have a "Location" type, identifying, by the processor, that the fifth and sixth columns are in the combinable relationship, and combining, by the processor, the fifth and sixth tables using the Spatial-Join method that has been selected; and outputting a combination table including the first and second tables as have been combined, the third and fourth tables as have been combined, and the fifth and sixth tables as have been combined.

* * * * *